(12) United States Patent
Koyama et al.

(10) Patent No.: US 10,294,987 B2
(45) Date of Patent: May 21, 2019

(54) BEARING DEVICE FOR CRANKSHAFT

(71) Applicants: TOYOTA JIDOSHA KABUSHIKI KAISHA, Toyota-shi, Aichi-ken (JP); TAIHO KOGYO CO., Ltd., Toyota-shi, Aichi-ken (JP)

(72) Inventors: Takashi Koyama, Mishima (JP); Yuta Uematsu, Sunto-gun (JP); Tsutomu Kubota, Toyota (JP)

(73) Assignees: Toyota Jidosha Kabushiki Kaisha, Toyota-shi, Aichi-ken (JP); Taiho Kogyo Co., Ltd., Toyota-shi, Aichi-ken (JP)

( * ) Notice: Subject to any disclaimer, the term of this patent is extended or adjusted under 35 U.S.C. 154(b) by 0 days.

(21) Appl. No.: 15/886,178

(22) Filed: Feb. 1, 2018

(65) Prior Publication Data
US 2018/0274586 A1 Sep. 27, 2018

(30) Foreign Application Priority Data
Mar. 21, 2017 (JP) ................................ 2017-054526

(51) Int. Cl.
*F16C 9/02* (2006.01)
*F16C 17/04* (2006.01)
(Continued)

(52) U.S. Cl.
CPC ............... *F16C 17/10* (2013.01); *F16C 9/02* (2013.01); *F16C 17/04* (2013.01); *F16C 33/1065* (2013.01); *F16C 33/1075* (2013.01)

(58) Field of Classification Search
CPC .. F16C 9/02; F16C 17/04; F16C 17/10; F16C 17/107
See application file for complete search history.

(56) References Cited

U.S. PATENT DOCUMENTS 6,481,895 B2 * 11/2002 Yang ..................... F16C 9/02
384/294
6,921,210 B2 * 7/2005 Welch .................. F16C 9/02
384/123

(Continued)

FOREIGN PATENT DOCUMENTS

JP 2003-113928 4/2003
JP 2010-071312 4/2010
(Continued)

*Primary Examiner* — James Pilkington
(74) *Attorney, Agent, or Firm* — Finnegan, Henderson, Farabow, Garrett & Dunner, LLP (57) ABSTRACT

A bearing device includes a thrust bearing. The thrust bearing has a bearing surface in a half-split ring shape, and a plurality of oil grooves formed to cross the bearing surface from an inner circumferential side to an outer circumferential side. Further, the thrust bearing includes a first thrust bearing that is disposed on a side surface facing a side of a transmission, and a second thrust bearing that is disposed on a side surface facing an opposite side to the transmission. In the first thrust bearing, a bearing surface between the plurality of oil grooves is configured by including a taper surface formed so that a wall thickness becomes thicker toward a rotation direction of the crankshaft. Further, in the second thrust bearing, a bearing surface between the plurality of oil grooves is configured by a plane in which a wall thickness is constant.

4 Claims, 6 Drawing Sheets

(51) Int. Cl.
*F16C 17/10* (2006.01)
*F16C 33/10* (2006.01)

(56) References Cited

U.S. PATENT DOCUMENTS 7,354,199 B2 * 4/2008 Welch ..................... F16C 9/00
 384/275
9,188,159 B2 * 11/2015 Tanaka ................. F16C 33/046

FOREIGN PATENT DOCUMENTS

| | | |
|---|---|---|
| JP | 2014-40899 | 3/2014 |
| JP | 2014-202295 | 10/2014 |

* cited by examiner

BEARING DEVICE FOR CRANKSHAFT

FIELD

The present disclosure relates to a bearing device for a crankshaft of an internal combustion engine, and particularly relates to a structure of a thrust bearing that receives a thrust load in an axial direction from the crankshaft.

BACKGROUND

An internal combustion engine includes a sliding bearing that bears a force in a radial direction of a crankshaft, and a thrust bearing that bears a force in an axial direction of the crankshaft. The sliding bearing is disposed in a bearing hole of a bearing support portion provided in a cylinder block, and rotatably supports a journal of the crankshaft. Further, the thrust bearing is a bearing having a bearing surface in a half-split ring shape, and is disposed in a circumferential edge of the bearing hole in both side faces of the bearing support portion.

Various thrust bearing shapes have been conventionally proposed. For example, Patent Literature 1 proposes to adopt a so-called taper land bearing in which a taper land including a taper surface is formed on a bearing surface as the thrust bearing. According to a configuration of the taper land bearing like this, a load capacity of the bearing surface increases, so that friction on the bearing surface is reduced.

Following is a list of patent literatures which the applicant has noticed as related arts of embodiments the present disclosure.

Patent Literature 1: JP 2014-040899 A
Patent Literature 2: JP 2010-071312 A
Patent Literature 3: JP 2003-113928 A
Patent Literature 4: JP 2014-202295 A

SUMMARY

Incidentally, the crankshaft of an internal combustion engine is connected to a transmission such as a torque convertor. In the structure like this, a thrust load in a direction to a main body of the internal combustion engine from a side of the transmission mainly occurs to the crankshaft. Consequently, magnitudes of the loads received by the thrust bearing that faces the side of the transmission and the thrust bearing that faces an opposite side from the transmission differ.

As described above, if the aforementioned taper land bearing is used as the thrust bearing for a crankshaft, a sliding friction loss of the bearing surface is reduced. However, the taper land bearing has a contradiction that pressure loss increases due to increase in pressure of an oil film. Consequently, when the thrust load received by the bearing surface is relatively small, it may not be the best to adopt a taper land bearing as the thrust bearing in some cases. In the above described conventional bearing device, the oil film pressure of the thrust bearing and sliding friction of the bearing surface are not optimized with consideration given to the characteristics of the thrust load that occurs to the crankshaft.

The present disclosure is made to solve the problem as described above, and has an object to provide a bearing device for a crankshaft, which can reduce sliding friction loss on the bearing surface while suppressing pressure loss due to an oil film of the thrust bearing.

In order to attain the above described object, a first disclosure is a bearing device for a crankshaft, which supports the crankshaft having one end to which a transmission is connected. The bearing device includes a bearing support portion that has a bearing hole penetrating between two side surfaces facing each other, and supports a journal of the crankshaft by the bearing hole, and a thrust bearing that has a bearing surface in a half-split ring shape, and a plurality of oil grooves formed to cross the bearing surface from an inner circumferential side to an outer circumferential side, and receives a force in an axial direction of the crankshaft by being disposed at a circumferential edge of the bearing hole in each of the two side surfaces. The thrust bearing includes a first thrust bearing that is disposed on a side surface facing a side of the transmission out of the two side surfaces, and a second thrust bearing that is disposed on a side surface facing an opposite side from the transmission out of the two side surfaces. In the first thrust bearing, a bearing surface between the plurality of oil grooves is configured by including a taper surface formed so that a wall thickness becomes thicker toward a rotation direction of the crankshaft. In the second thrust bearing, a bearing surface between the plurality of oil grooves is configured by a plane in which a wall thickness is constant.

A second disclosure is, in the first disclosure, such that in the first thrust bearing, a bearing surface between the plurality of oil grooves is configured by including a plane that is formed so that the wall thickness becomes constant from a thickest portion of the taper surface.

A third disclosure is, in the first disclosure, such that the bearing support portion includes a saddle portion provided in an engine block of the internal combustion engine, and a cap portion that is fixed to the saddle portion, and rotatably supports the crankshaft disposed in the saddle portion. The thrust bearing is provided at either one or both of the saddle portion and the cap portion.

A fourth disclosure is, in the first disclosure, such that the thrust bearing is configured as a flange bearing configured to be integrated with a sliding bearing that receives a force in a radial direction of the crankshaft.

A thrust load in a direction to press the crankshaft from the transmission occurs to the crankshaft. Consequently, friction between the first thrust bearing and the crankshaft becomes larger than friction between the second thrust bearing and the crankshaft. According to the first disclosure, the bearing surface of the first thrust bearing is configured by including the taper surface formed so that the wall thickness becomes thicker toward the rotation direction of the crankshaft, and the bearing surface of the second thrust bearing is configured by the plane formed so that the wall thickness is constant. According to the configuration like this, a load capacity of the bearing surface with large friction can be made larger than a load capacity of the bearing surface with small friction, so that it becomes possible to reduce sliding friction loss of the bearing surface while suppressing the pressure loss of the oil film of the thrust bearing.

According to the second disclosure, the bearing surface of the first thrust bearing is configured by including the plane formed so that the wall thickness is constant from the thickest portion of the taper surface. According to the configuration like this, the load capacity of the bearing surface can be effectively increased, so that big contribution can be made to reduction in sliding friction loss.

According to the third disclosure, the thrust bearing is provided at either one or both of the saddle portion and the cap portion. Consequently, according to the present disclosure, the thrust load of the crankshaft can be reliably received.

According to the fourth disclosure, the thrust bearing is configured as the flange bearing configured to be integrated with the sliding bearing. Consequently, according to the present disclosure, the number of components can be reduced.

DESCRIPTION OF EMBODIMENT

Hereinafter, an embodiment of the present disclosure will be described with reference to the drawings. Note that when the numerals of the numbers, the quantities, the amounts, the ranges and the like of the respective elements are mentioned in the embodiment shown as follows, the present disclosure is not limited to the mentioned numerals unless specially explicitly described otherwise, or unless the disclosure is explicitly specified by the numerals theoretically. Further, the structures that are described in the embodiment shown as follows are not always indispensable to the disclosure unless specially explicitly shown otherwise, or unless the disclosure is explicitly specified by the structures theoretically.

First Embodiment

Hereinafter, a first embodiment of the present disclosure will be described with reference to the drawings.

Configuration of First Embodiment

Figure 1:
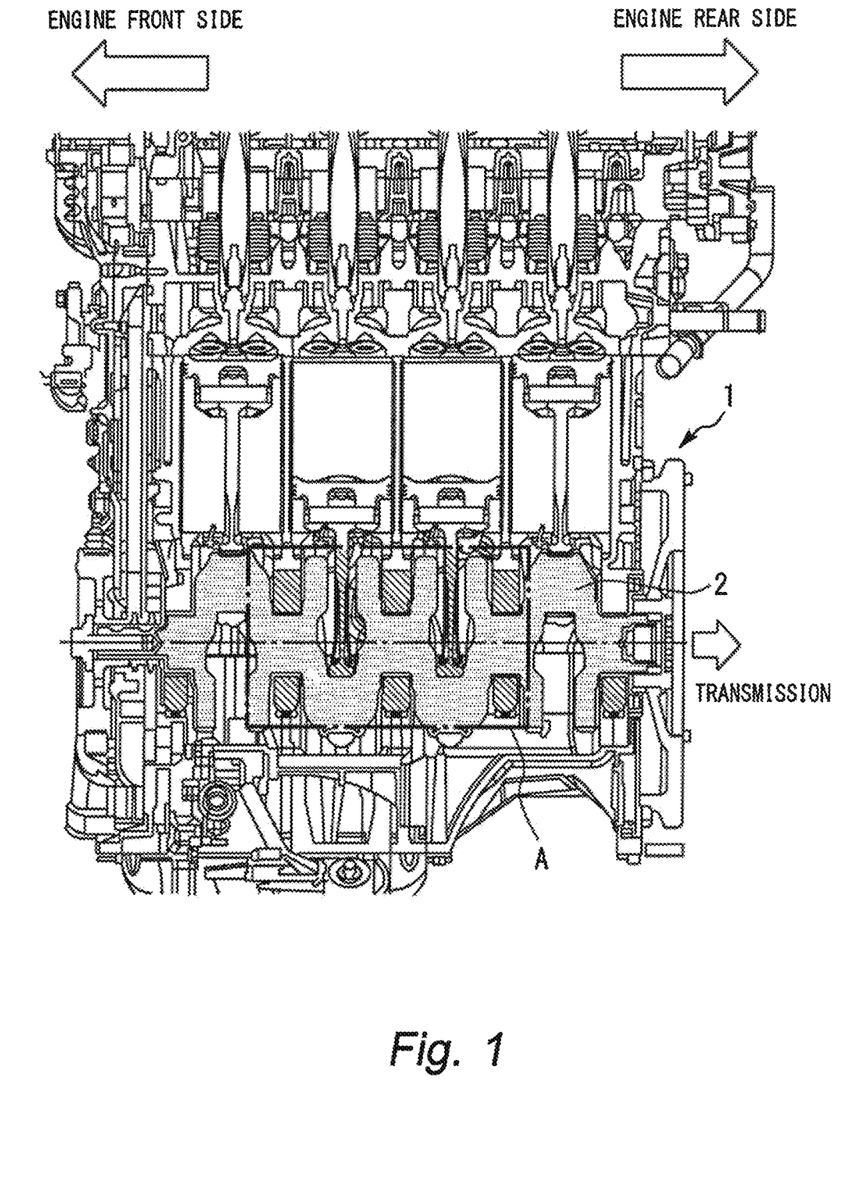
FIG. 1 is a view illustrating a configuration of an engine main body of an internal combustion engine (engine) to which a bearing device for a crankshaft according to a first embodiment of the present disclosure is applied.

FIG. 1 is a view illustrating a configuration of an engine main body of an internal combustion engine (engine) to which a bearing device for a crankshaft according to the first embodiment of the present disclosure is adopted. FIG. 1 schematically illustrates a section of an engine main body that is cut along a vertical surface passing through a center axis of the crankshaft. The engine of the present embodiment is a spark ignition type engine. The engine is loaded on a vehicle as a power source. An engine main body 1 of the engine includes a plurality of cylinders. FIG. 1 illustrates an example in which four cylinders are disposed in series, but the number of cylinders and arrangement of the cylinders are not limited.

In the engine main body 1, a crankshaft 2 is contained. A transmission not illustrated is connected to one end side of the crankshaft 2. The transmission may be an automatic transmission (AT) including a torque converter and a continuous variable transmission (CVT), or may be a transmission including a clutch. Note that in the following explanation, in the engine main body 1, a side where the transmission is provided is referred to as an "engine rear side", and a side where the transmission is not provided is referred to as an "engine front side".

Figure 2:
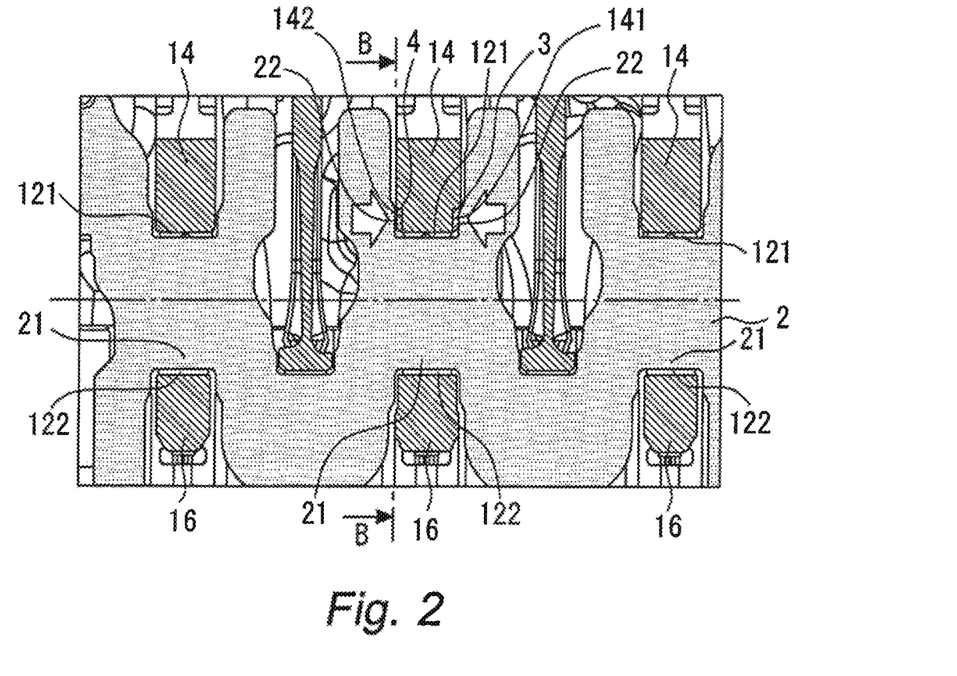
FIG. 2 is a diagram enlarging a bearing portion A of the crankshaft in FIG. 1.
Figure 3:
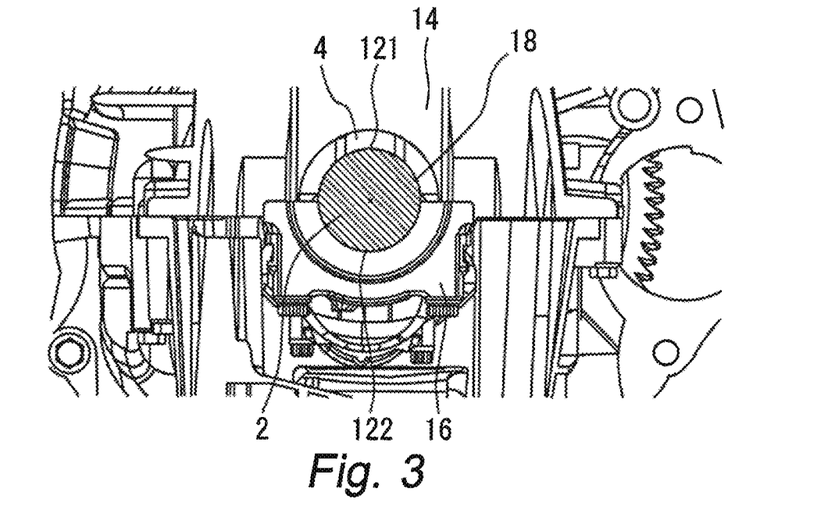
FIG. 3 is a schematic view of the bearing portion in FIG. 2 cut along line B-B and seen from an axial direction of the crankshaft.

FIG. 2 is a view enlarging a bearing portion A of the crankshaft in FIG. 1. Further, FIG. 3 is a schematic view of the bearing portion in FIG. 2 cut along a line B-B in FIG. 2 and seen from an axial direction of the crankshaft. Hereinafter, with reference to FIGS. 2 and 3, a bearing device for the crankshaft 2 will be described in more detail. As illustrated in FIG. 2, the crankshaft 2 is rotatably supported by sliding bearings 121 and 122 that are disposed in a bearing hole 18 that penetrates through both side surfaces of a bearing support portion. The sliding bearings 121 and 122 are bearings for receiving a force in a radial direction of the crankshaft, and are configured as a pair of half-split type bearings obtained by splitting a cylindrical component into two by a plane including an axis of the component. The sliding bearings 121 and 122 are respectively installed in a saddle portion 14 and a cap portion 16 as bearing support portions. The saddle portion 14 is a structure configured at an engine block side of the engine main body 1, and the cap portion 16 is a structure configured as a separate component from the engine block of the engine main body 1. The cap portion 16 is fixed to the saddle portion 14, and thereby the bearing hole 18 in which the sliding bearings 121 and 122 are disposed is formed.

A bearing seat 141 is provided on a side surface that faces an engine rear side (that is, a side of the transmission) out of two side surfaces of the saddle portion 14 located between the second cylinder and the third cylinder. Further, a bearing seat 142 is provided on a side surface that faces an engine front side (that is, an opposite side from the transmission) out of the two side surfaces of the saddle portion 14. The bearing seats 141 and 142 are recessed portions for positioning thrust bearings 3 and 4, and are provided at the circumferential edge of the bearing hole 18. The thrust bearings 3 and 4 are configured as bearings in half-split ring shapes which are obtained by splitting a ring-shaped component into two by a plane including an axis of the component. Note that the thrust bearing 3 corresponds to a "first thrust bearing" of the present disclosure, and the thrust bearing 4 corresponds to a "second thrust bearing" of the present disclosure. The thrust bearings 3 and 4 are respectively disposed on the bearing seats 141 and 142 so that bearing surfaces 31 and 41 in half-split ring shapes face a slide surface 22 of the crankshaft 2. The slide surface 22 is a ring-shaped plane provided at both ends of a journal 21. When the crankshaft 2 rotates, the slide surface 22 slides with respect to the bearing surfaces 31 and 41. According to the configuration like this, the thrust bearings 3 and 4 bear a thrust load in the axial direction that occurs to the crankshaft 2 by the bearing surfaces 31 and 41.

Characteristic Configuration of First Embodiment

Next, a characteristic configuration of the bearing device of the first embodiment will be described. The inventor of the present application has repeatedly conducted earnest research on the thrust load received by the crankshaft 2. As a result, the inventor has found that during traveling of a vehicle, a thrust load in the direction toward the engine front side from the engine rear side to which the transmission is connected mainly occurs to the crankshaft 2. Considering from such a premise, in the configuration in which a CVT is connected to the engine main body via a torque converter, for example, a thrust load in the direction toward the engine main body from the torque converter mainly occurs during traveling of the vehicle. In this case, the friction loss by the slide of the slide surface 22 is relatively larger on the side of the thrust bearing 3 provided at the engine rear side with respect to the saddle portion 14 than on the side of the thrust bearing 4 provided at the engine front side with respect to the saddle portion 14.

Thus, in the bearing device of the first embodiment, a bearing having a larger load capacity than the thrust bearing 4 is used as the thrust bearing 3. In more detail, a taper land bearing is used as the thrust bearing 3 disposed at the engine rear side, and a flat-shaped bearing is used as the thrust bearing 4 disposed at the engine front side. Hereunder, configurations of these bearings will be described in more detail.

Figure 4:
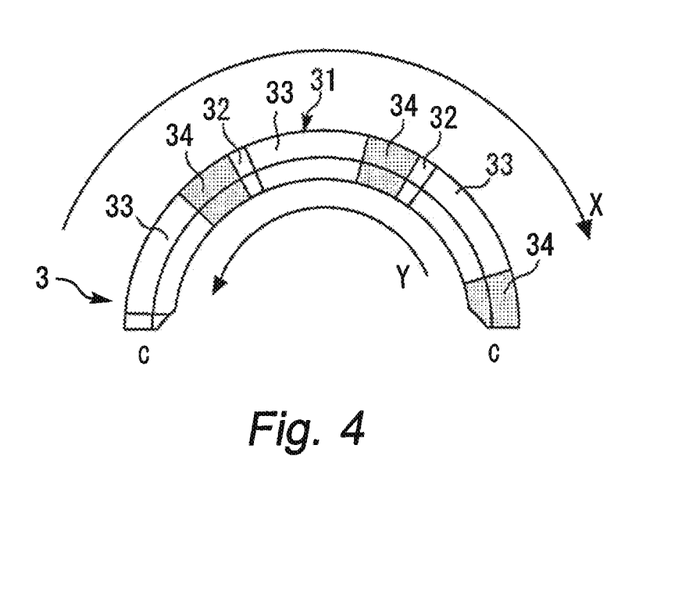
FIG. 4 is a view for explaining a configuration of a taper land bearing.
Figure 5:
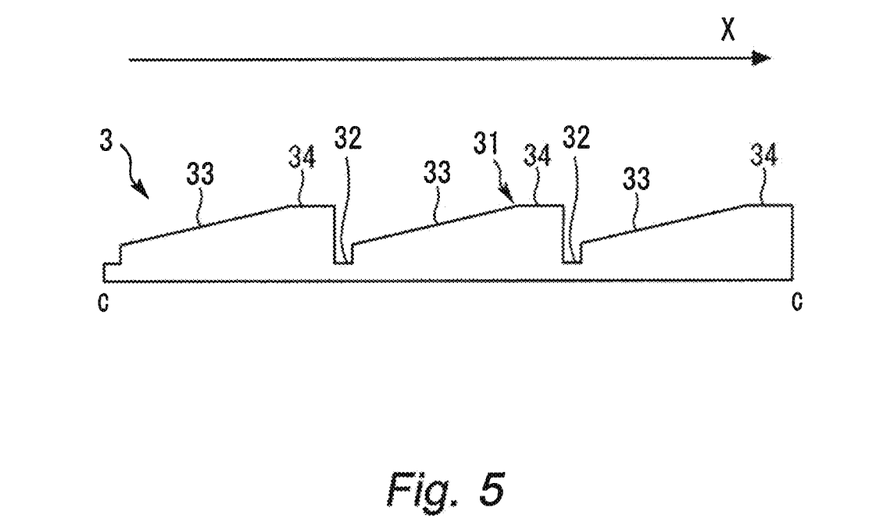
FIG. 5 is a view schematically illustrating a sectional shape in a case where the bearing is cut along a curved line C-C in FIG. 4.

FIG. 4 is a view for explaining a configuration of a taper land bearing. Further, FIG. 5 is a view schematically illustrating a sectional shape in the case where the bearing is cut along a curved line C-C in FIG. 4. Note that a direction shown by an arrow X in these drawings indicates a relative sliding direction of the bearing surface 31 with respect to the slide surface 22, and a direction shown by an arrow Y in the drawings indicates a rotation direction of the crankshaft 2. As illustrated in these drawings, in the taper land bearing as the thrust bearing 3, an oil groove 32, a taper portion 33 and a land portion 34 are formed on the bearing surface 31. The oil groove 32 is a groove that is formed to cross the bearing surface 31 from an inner circumferential side to an outer circumferential side of the bearing surface 31, and a plurality of oil grooves 32 are formed.

The taper portion 33 and the land portion 34 are formed between the two oil grooves 32 in the bearing surface 31. The taper portion 33 is formed by a taper surface that inclines so that a wall thickness that is a thickness of the bearing becomes gradually thicker toward the rotation direction of the crankshaft 2 from an end portion of the oil groove 32 (that is, along a relative sliding direction). According to a shape of the taper portion 33 like this, a gap from the slide surface 22 becomes gradually narrow along the relative sliding direction of the bearing surface 31. The land portion 34 is configured by a plane extending to the adjacent oil groove 32 along the relative sliding direction of the bearing surface 31 from the thickest portion of the taper portion 33 where the wall thickness is the thickest. According to the shape of the land portion 34 like this, the gap between the bearing surface 31 and the slide surface 22 becomes constant. Note that since the oil groove 32 is a groove deeper than the taper portion 33 and the land portion 34, a border between the oil groove 32 and the taper portion 33 and a border between the oil groove 32 and the land portion 34 have level differences. In the thrust bearing 3, a plurality of taper land portions each configured by the taper portion 33 and the land portion 34 like them are formed continuously in the circumferential direction of the bearing surface 31.

Figure 6:
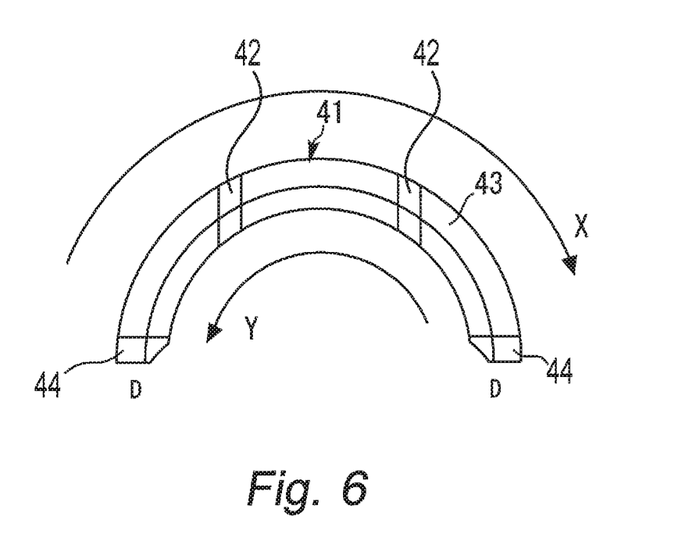
FIG. 6 is a view for explaining a configuration of a flat-shaped bearing.
Figure 7:
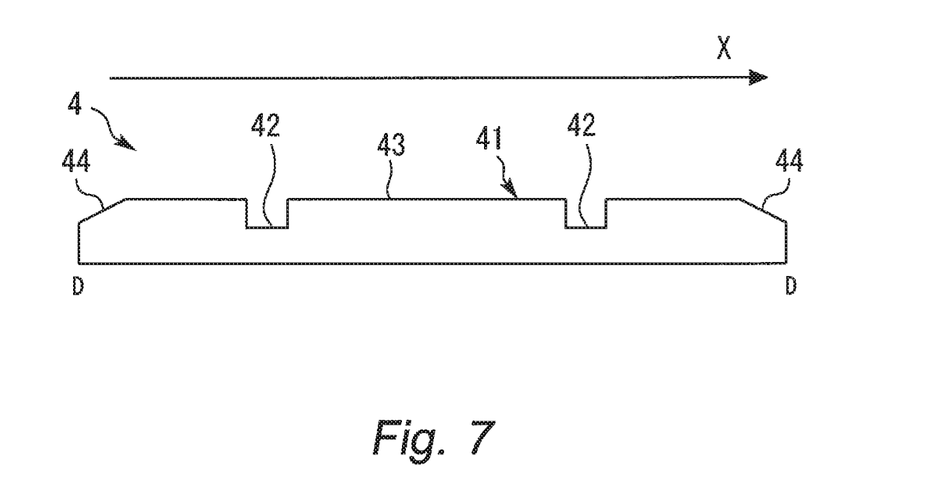
FIG. 7 is a view schematically illustrating a sectional shape in a case where the bearing is cut along a curved line D-D in FIG. 6.

FIG. 6 is a view for explaining a configuration of a flat-shaped bearing. Further, FIG. 7 is a view schematically illustrating a sectional shape in a case where the bearing is cut along a curved line D-D in FIG. 6. Note that a direction shown by an arrow X in these drawings indicates a relative sliding direction of the bearing surface 41 with respect to the slide surface 22, and a direction shown by an arrow Y in the drawings indicates a rotation direction of the crankshaft 2. As illustrated in these drawings, in the flat-shaped bearing as the thrust bearing 4, a flat-shaped portion 43 is formed on the bearing surface 41 except for oil grooves 42 and relief portions 44. The flat-shaped portion 43 is formed by a plane where a gap from the slide surface 22 is constant toward the rotation direction of the crankshaft 2 (that is, along a relative sliding direction of the bearing surface 41). The oil groove 42 is a groove that is formed to cross the bearing surface 41 toward an outer circumferential side from an inner circumferential side of the bearing surface 41, and a plurality (two in the drawing) of oil grooves 42 are formed. Note that the oil groove 42 is a groove deeper than the flat-shaped portion 43, so that a border between the oil groove 42 and the flat-shaped portion 43 has a level difference. The relief portions 44 are formed by cutting out edges of both end portions of the bearing surface 41.

Operational Effect of Bearing Device of First Embodiment

Next, an operational effect of the bearing device obtained with the aforementioned structure will be described with reference to FIGS. 8 and 9.

Figure 8:
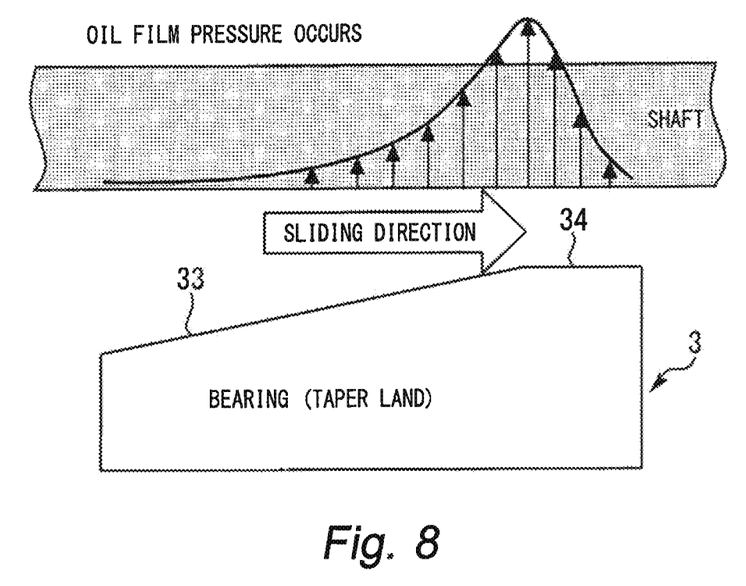
FIG. 8 is a diagram illustrating a distribution of oil film pressure that occurs to a bearing surface of a thrust bearing configured as a taper land bearing, at a time of an operation of the internal combustion engine.
Figure 9:
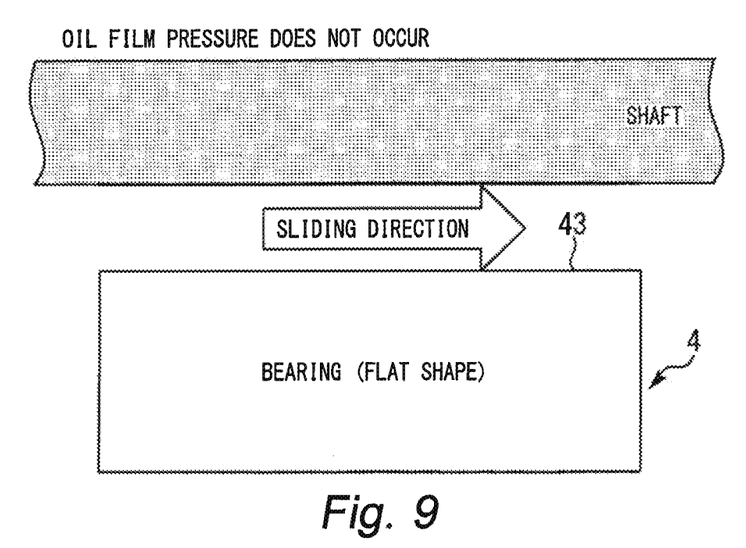
FIG. 9 is a diagram illustrating a distribution of oil film pressure that occurs to a bearing surface of a thrust bearing configured as a flat-shaped bearing, at a time of an operation of the internal combustion engine.

FIG. 8 is a diagram illustrating a distribution of oil film pressure that occurs to the bearing surface of the thrust bearing configured as the taper land bearing during an operation of the internal combustion engine. As illustrated in FIG. 8, the oil film pressure that occurs to the taper land portion becomes maximum in the thickest portion of the taper portion 33, and becomes closer to zero toward the land portion 34. What is obtained by integrating the oil film pressure in the axial direction, that is, an area of the oil film pressure distribution shows a magnitude of a force of the oil film of the bearing surface 31 that holds the slide surface 22. FIG. 9 is a diagram illustrating a distribution of oil film pressure that occurs to the bearing surface of the thrust bearing configured as the flat-shaped bearing during an operation of the internal combustion engine. As illustrated in FIG. 9, the oil film pressure does not occur to the flat-shaped portion 43.

As described above, in the configuration of the engine of the first embodiment, the thrust load in the direction toward the engine front side from the engine rear side to which the transmission is connected occurs to the crankshaft 2. Consequently, if the oil film pressure between the bearing surface 31 of the thrust bearing 3 and the slide surface 22 of the crankshaft 2 is low, there arises the fear that worsening of fuel efficiency due to wear and friction loss of the bearing surface 31 becomes a problem. Consequently, the thrust bearing 3 has a high necessity to enhance oil film pressure. On the other hand, the thrust load received by the bearing surface 41 of the thrust bearing 4 is relatively smaller than the thrust load received by the bearing surface 31 of the thrust bearing 3. Consequently, the thrust bearing 4 has a low necessity to enhance the oil film pressure, and the configuration in which the oil film pressure is kept low and pressure loss is suppressed is more preferable.

In the bearing device of the first embodiment, the above described taper land bearing is used as the thrust bearing 3, and the above described flat-shaped bearing is used as the thrust bearing 4. According to the configuration like this, pressure loss of the oil film between the bearing surface 41 of the thrust bearing 4 and the slide surface 22 is reduced while the oil film between the bearing surface 31 of the thrust bearing 3 and the slide surface 22 of the crankshaft 2 is held. Consequently, it becomes possible to reduce the slide friction loss of the bearing surfaces 31 and 41 while suppressing the pressure loss by the oil films on the thrust bearings 3 and 4.

Further, when a negative pressure occurs to the oil film pressure on the bearing surface, a foreign matter is likely to be brought to the bearing surface. Such a situation occurs in the bearing surface including a so-called reverse taper surface in which a wall thickness of the bearing surface becomes thin along the sliding direction, for example. In this regard, in the bearing device of the first embodiment, the thrust bearing 4 is configured by the flat-shaped portion 43, so that it becomes possible to effectively prevent a foreign matter from being brought to the bearing surface by the negative oil film pressure.

Further, in the bearing device of the first embodiment, the thrust bearing 3 is configured by including the land portion 34, and the thrust bearing 4 is configured by including the flat-shaped portion 43. According to the configuration like this, a deviation of the slide surface 22 due to a distortion of the crankshaft 2 can be effectively suppressed by a squeeze effect by the bearing surface formed by a plane.

Modified Example of Structure of Bearing Device

Figure 10:
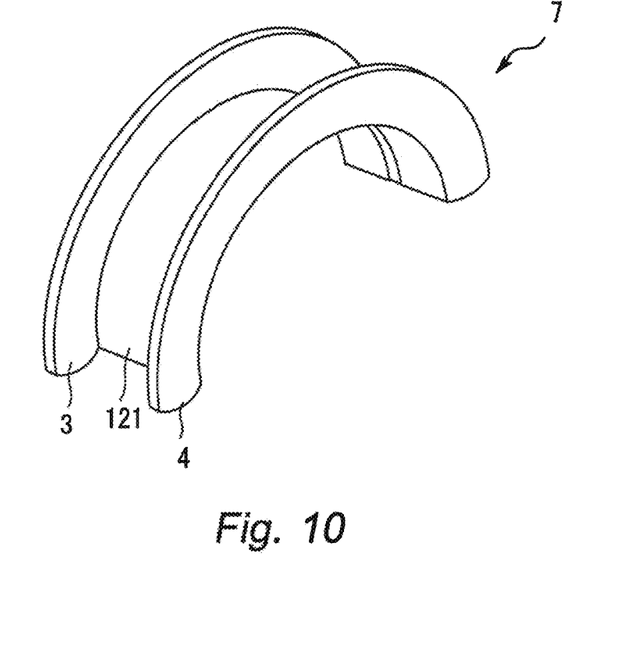
FIG. 10 is a view illustrating a modified example of a structure of the bearing device.

FIG. 10 is a view illustrating a modified example of a structure of the bearing device. In the example illustrated in the drawing, the bearing device is configured as a flange bearing 7 in which the thrust bearings 3 and 4 are integrated with the sliding bearing 121. According to the structure of the bearing device like this, the number of components can be reduced.

The thrust bearings 3 and 4 may be provided on both side surfaces of the cap portion 16 in place of the saddle portion 14 or in addition to the saddle portion 14. Further, the bearing surface 31 of the thrust bearing 3 may be configured by only the taper portion 33 without including the land portion 34. Further, in the thrust bearing 3, the number of taper land portions that continue is not specially limited.

What is claimed is:

1. A bearing device for a crankshaft, which supports the crankshaft having one end to which a transmission is connected, the bearing device comprising:
a bearing support portion that has a bearing hole penetrating between two side surfaces on opposite sides of the bearing support portion, and supports a journal of the crankshaft by the bearing hole;
a first thrust bearing that is disposed on a first side surface of the bearing support portion facing a side of the transmission out of the two side surfaces, the first thrust bearing including a first bearing surface in a half-split ring shape, and a plurality of oil grooves formed to cross the first bearing surface from an inner circumferential side to an outer circumferential side, and the first bearing surface receiving a force in an axial direction of the crankshaft by being disposed at a circumferential edge of the bearing hole in the first side surface; and
a second thrust bearing that is disposed on a second side surface of the bearing support portion facing an opposite side from the transmission out of the two side surfaces, the second thrust bearing including a second bearing surface in a half-split ring shape, and a plurality of oil grooves formed to cross the second bearing surface from an inner circumferential side to an outer circumferential side, and the second bearing surface receiving a force in an axial direction of the crankshaft by being disposed at a circumferential edge of the bearing hole in the second side surface;
in the first thrust bearing, the first bearing surface between the plurality of oil grooves is configured by including a taper surface formed so that a wall thickness of the first thrust bearing becomes thicker toward a rotation direction of the crankshaft, and
in the second thrust bearing, the second bearing surface between the plurality of oil grooves is configured in a plane such that the second thrust bearing has a constant wall thickness in a region between the plurality of oil grooves.

2. The bearing device for a crankshaft according to claim 1,
wherein in the first thrust bearing, the first bearing surface between the plurality of oil grooves is configured by including to include a portion in a plane adjacent a thickest portion of the taper surface, wherein the portion in a plane is formed so that the wall thickness of the first thrust bearing becomes constant from the thickest portion of the taper surface to one of the plurality of oil grooves.

3. The bearing device for a crankshaft according to claim 1,
wherein the bearing support portion includes
a saddle portion provided in an engine block of the internal combustion engine, and
a cap portion that is fixed to the saddle portion, and rotatably supports the crankshaft disposed in the saddle portion, and
at least one of the first thrust bearing or the second thrust bearing is provided at either one or both of the saddle portion and the cap portion.

4. The bearing device for a crankshaft according to claim 1,
wherein at least one of the first thrust bearing or the second thrust bearing is configured as a flange bearing configured to be integrated with a sliding bearing that receives a force in a radial direction of the crankshaft.

* * * * *